US012600253B2

(12) United States Patent
Menon et al.

(10) Patent No.: US 12,600,253 B2
(45) Date of Patent: Apr. 14, 2026

(54) SYSTEMS AND METHODS FOR THE LOCALIZATION AND NAVIGATION OF A VEHICLE TO A CHARGE STATION

(71) Applicant: Ford Global Technologies, LLC, Dearborn, MI (US)

(72) Inventors: Meghna Menon, Ann Arbor, MI (US); Smruti Panigrahi, Novi, MI (US); Gregory P. Linkowski, Dearborn, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 18/415,470

(22) Filed: Jan. 17, 2024

(65) Prior Publication Data

US 2025/0229660 A1    Jul. 17, 2025

(51) Int. Cl.
| | |
|---|---|
| *B60L 53/36* | (2019.01) |
| *B60L 53/37* | (2019.01) |
| *B60L 53/38* | (2019.01) |
| *B60W 30/06* | (2006.01) |
| *B60W 60/00* | (2020.01) |

(52) U.S. Cl.
CPC .............. *B60L 53/36* (2019.02); *B60L 53/37* (2019.02); *B60L 53/38* (2019.02); *B60W 30/06* (2013.01); *B60W 60/001* (2020.02); *B60W 2420/90* (2013.01); *B60W 2520/06* (2013.01); *B60W 2556/50* (2020.02)

(58) Field of Classification Search
CPC .......... B60L 53/36; B60L 53/37; B60L 53/38; B60W 30/06; B60W 60/001; B60W 2420/90; B60W 2520/06; B60W 2556/50; G01C 21/005; G01C 21/3407; G01C 21/36
See application file for complete search history.

(56) References Cited

U.S. PATENT DOCUMENTS

| | | | |
|---|---|---|---|
| 10,384,775 | B2 | 8/2019 | Krishnamoorthy et al. |
| 10,493,855 | B2 | 12/2019 | Chase et al. |
| 2015/0073642 | A1 | 3/2015 | Widmer et al. |
| 2017/0315557 | A1* | 11/2017 | Vogt ..................... G05D 1/0242 |
| 2019/0016331 | A1 | 1/2019 | Carlson et al. |
| 2019/0141467 | A1 | 5/2019 | Breed |
| 2019/0146500 | A1 | 5/2019 | Yalla et al. |
| 2019/0168747 | A1* | 6/2019 | Higashitani ........... B60W 30/06 |
| 2020/0371533 | A1 | 11/2020 | Kentley-Klay et al. |
| 2021/0276433 | A1* | 9/2021 | Mandel-Senft ....... B60L 53/305 |
| 2021/0341310 | A1 | 11/2021 | Wilbers et al. |
| 2021/0372796 | A1 | 12/2021 | Lin et al. |
| 2022/0036020 | A1 | 2/2022 | Kovarik et al. |

(Continued)

FOREIGN PATENT DOCUMENTS

KR    1020150038776    4/2015

*Primary Examiner* — Jelani A Smith
*Assistant Examiner* — Alyssa Rorie
(74) *Attorney, Agent, or Firm* — Burris Law, PLLC

(57) ABSTRACT

A method of marshaling an autonomously operated vehicle including the maneuvering of a vehicle toward a position and orientation associated with a charging station, the receipt of location data associated with a first position of the vehicle, and the initiation of an approach to engage the charging station based on updated location data associated with a second position of the vehicle.

20 Claims, 8 Drawing Sheets

(56) References Cited

U.S. PATENT DOCUMENTS

| | | | |
|---|---|---|---|
| 2022/0161815 A1 | 5/2022 | Van Beek et al. | |
| 2023/0038722 A1* | 2/2023 | Kumar | H04W 4/40 |
| 2023/0106274 A1* | 4/2023 | Hau | B60L 53/305 |
| | | | 320/109 |
| 2023/0141507 A1* | 5/2023 | Lee | H02J 50/90 |
| | | | 320/109 |
| 2023/0145508 A1 | 5/2023 | Kaphengst et al. | |
| 2023/0166625 A1* | 6/2023 | Sato | B60L 53/305 |
| | | | 701/22 |
| 2025/0121710 A1* | 4/2025 | Zhao | B60L 53/65 |

* cited by examiner

700

MANEUVERING A VEHICLE TOWARD A POSITION AND
ORIENTATION ASSOCIATED WITH A CHARGING STATION          702

RECEIVING LOCATION DATA ASSOCIATED WITH A FIRST
POSITION OF THE VEHICLE          704

INITIATING, BASED ON UPDATED LOCATION DATA
ASSOCIATED WITH A SECOND POSITION OF THE
VEHICLE, AN APPROACH TO ENGAGE THE CHARGING
STATION          706

*800*

RECEIVING LOCATION DATA FROM ONE OR MORE POSITIONING SENSORS — *802*

DETERMINING, BASED ON A DEEP LEARNING MODEL AND THE LOCATION DATA, POSITIONAL DATA ASSOCIATED WITH A VEHICLE — *804*

INITIATING AN APPROACH TO ENGAGE THE CHARGING STATION — *806*

SYSTEMS AND METHODS FOR THE LOCALIZATION AND NAVIGATION OF A VEHICLE TO A CHARGE STATION

FIELD

The present disclosure relates to automated localization and navigation of a vehicle. More specifically, the present disclosure relates to systems and methods directed toward the localization and navigation of the vehicle toward a charging station.

BACKGROUND

The statements in this section merely provide background information related to the present disclosure and may not constitute prior art.

Marshaling systems associated with the automated transport of vehicles is becoming increasingly popular. However, such marshaling systems can face a variety of logistical issues that reduce the distance at which the one or more vehicles may be marshaled without human intervention. Automated charging stations within the marshaling system have been used to address these issues. However, even with the use of automated charging stations, at least some form of human intervention to support the charging of the vehicle is still needed.

The present disclosure addresses these and other issues related to the localization and navigation of vehicles, particularly to charging stations.

SUMMARY

This section provides a general summary of the disclosure and is not a comprehensive disclosure of its full scope or all of its features.

The present disclosure provides a method of marshaling an autonomously operated vehicle, the method comprising: causing to maneuver, by a central server, the vehicle toward a position and orientation associated with a charging station; receiving, by the central server, from one or more positioning sensors, location data associated with a position of the vehicle; and sending, by the central server, to the vehicle based on the location data, updated location data associated with the position of the vehicle, thereby causing the vehicle to initiate an approach to engage the charging station based on the updated location data; further comprising: determining, based on the location data, that the vehicle is not being caused to maneuver toward the charging station; and re-localizing, based on the vehicle not being caused to maneuver toward the charging station, the vehicle toward the charging station; wherein the position is a global coordinate position and the one or more positioning sensors include pressure sensors, magnets, ultrasonics, proximity sensors, ultra-wide band tags, RFID tags, or a combination thereof; wherein the location data and the updated location data are received via one or more of: ultra-wide band, Bluetooth®, WIFI, CV2X, a public cellular network, or a private cellular network; wherein causing the vehicle to initiate an approach to engage the charging station further comprises: receiving, from the vehicle, positional data associated with the position of the vehicle; wherein the positional data is based on one or more of: a deep learning model used to detect the charging station via a camera associated with the vehicle; a fiducial associated with the charging station identified via the camera, ultrasonics, or radar associated with the vehicle; or an alignment with a wheel chock and at least one wheel of the vehicle; and wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle.

The present disclosure provides a marshaling system for positioning an autonomously operated vehicle, the marshaling system comprising: one or more positioning sensors configured to send location data associated with a position of the vehicle; a central server configured to: cause to maneuver the vehicle toward a position and orientation associated with a charging station, receive, from the one or more in-ground sensors, the location data, and send, to the vehicle based on the location data, updated location data associated with the position of the vehicle, thereby causing the vehicle to initiate an approach to engage the charging station based on the updated location data; and the vehicle configured to: receive the updated location data, determine, based on a deep learning model, positional data associated with the vehicle, wherein the deep learning model is used to detect the charging station via a camera associated with the vehicle, identify, based on the positional data, the charging station, and initiate an approach to engage the charging station; wherein the central server is further configured to: determine, based on the location data, that the vehicle is not being caused to maneuver toward the charging station; and re-localize, based on the vehicle not being caused to maneuver toward the charging station, the vehicle toward the charging station; wherein the position is a global coordinate position and the one or more positioning sensors include pressure sensors, magnets, ultrasonics, proximity sensors, ultra-wide band tags, RFID tags, or a combination thereof; wherein the location data and the updated location data are received via one or more of: ultra-wide band, Bluetooth®, WIFI, CV2X, a public cellular network, or a private cellular network; wherein the vehicle is further configured to determine the positional data based on one or more of: a fiducial associated with the charging station identified via the camera, ultrasonics, or radar associated with the vehicle; or an alignment with a wheel chock and at least one wheel of the vehicle; and wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle.

The present disclosure provides one or more non-transitory computer-readable media storing processor-executable instructions that, when executed by at least one processor, cause the at least one processor to: cause to maneuver the vehicle toward a position and orientation associated with a charging station; receive, from one or more in-ground sensors, location data associated with a position of the vehicle; and send, to the vehicle based on the location data, updated location data associated with the position of the vehicle, thereby causing the vehicle to initiate an approach to engage the charging station based on the updated location data; wherein the at least one processor is further caused to: determine, based on the location data, that the vehicle is not being caused to maneuver toward the charging station; and re-localize, based on the vehicle not being caused to maneuver toward the charging station, the vehicle toward the charging station; wherein the position is a global coordinate position and the one or more positioning sensors include pressure sensors, magnets, ultrasonics, proximity sensors, ultra-wide band tags, RFID tags, or a combination thereof; wherein the location data and the updated location data is received via one or more of: ultra-wide band, Bluetooth®, Wi-Fi, CV2X, a public cellular network, or a private cellular network; wherein the processor-executable instructions that, when executed by the at least one processor, cause the vehicle to initiate an approach to engage the charging station, further cause the at least one processor to: receive, from the vehicle, positional data associated with the position of the vehicle; wherein the positional data is based on one or more of: a deep learning model used to detect the charging station via a camera associated with the vehicle; a fiducial associated with the charging station identified via the camera, ultrasonics, or radar associated with the vehicle; or an alignment with a wheel chock and at least one wheel of the vehicle; and wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
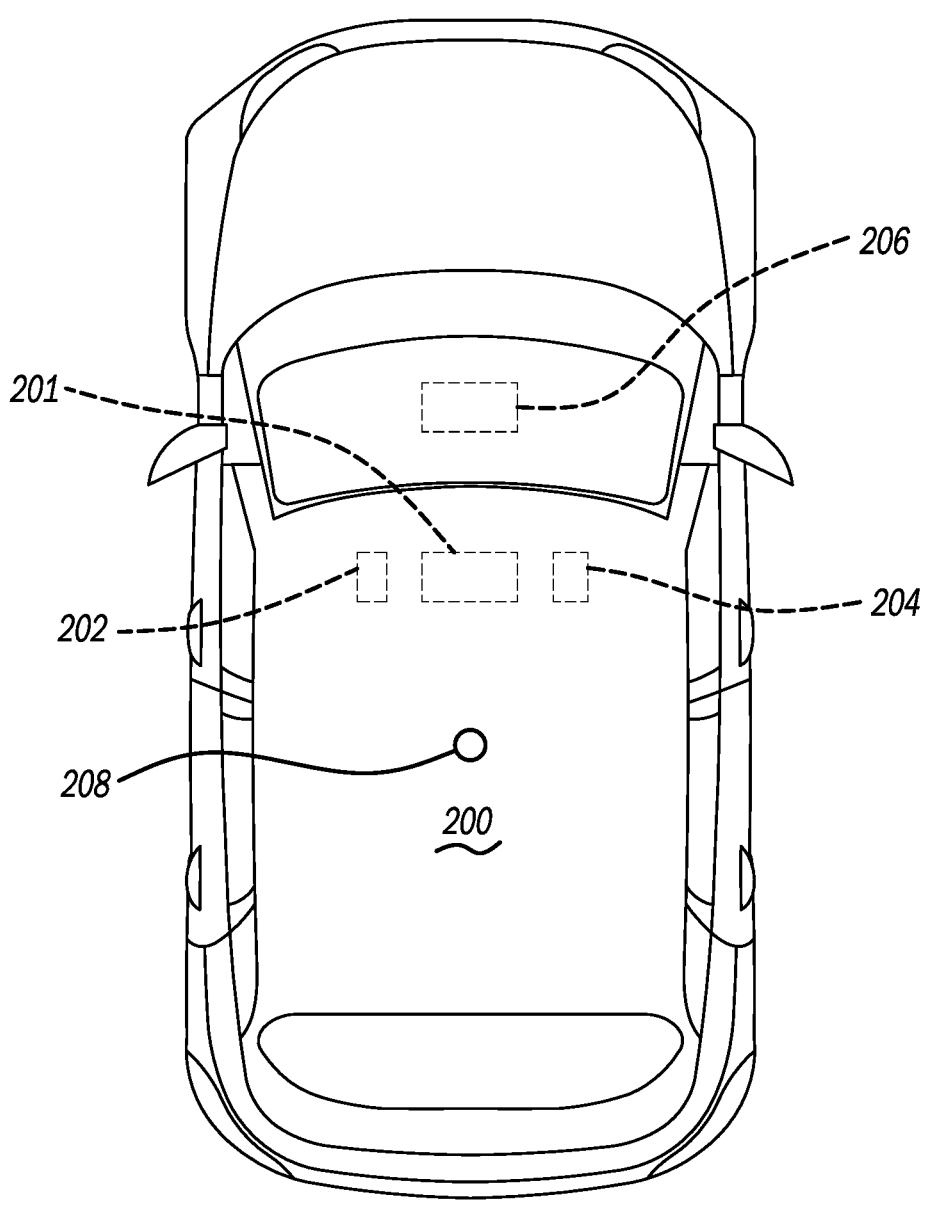
FIG. 2 illustrates an example vehicle associated with the system shown in FIG. 1 in accordance with various implementations.
Figure 3:
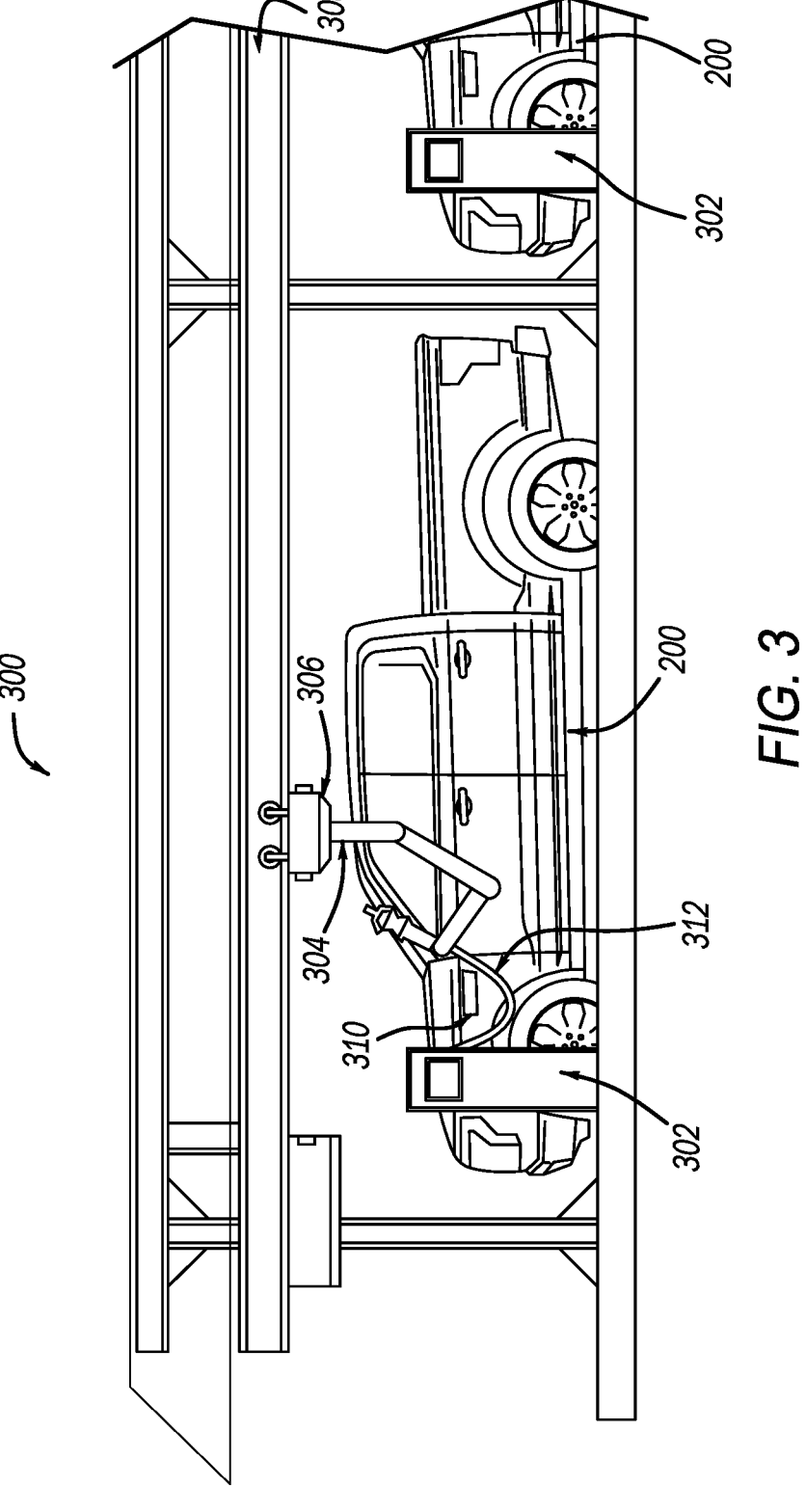
FIG. 3 illustrates a general engagement of the vehicle shown in FIG. 2 with a hands-free charging station in accordance with various implementations.
Figure 5:
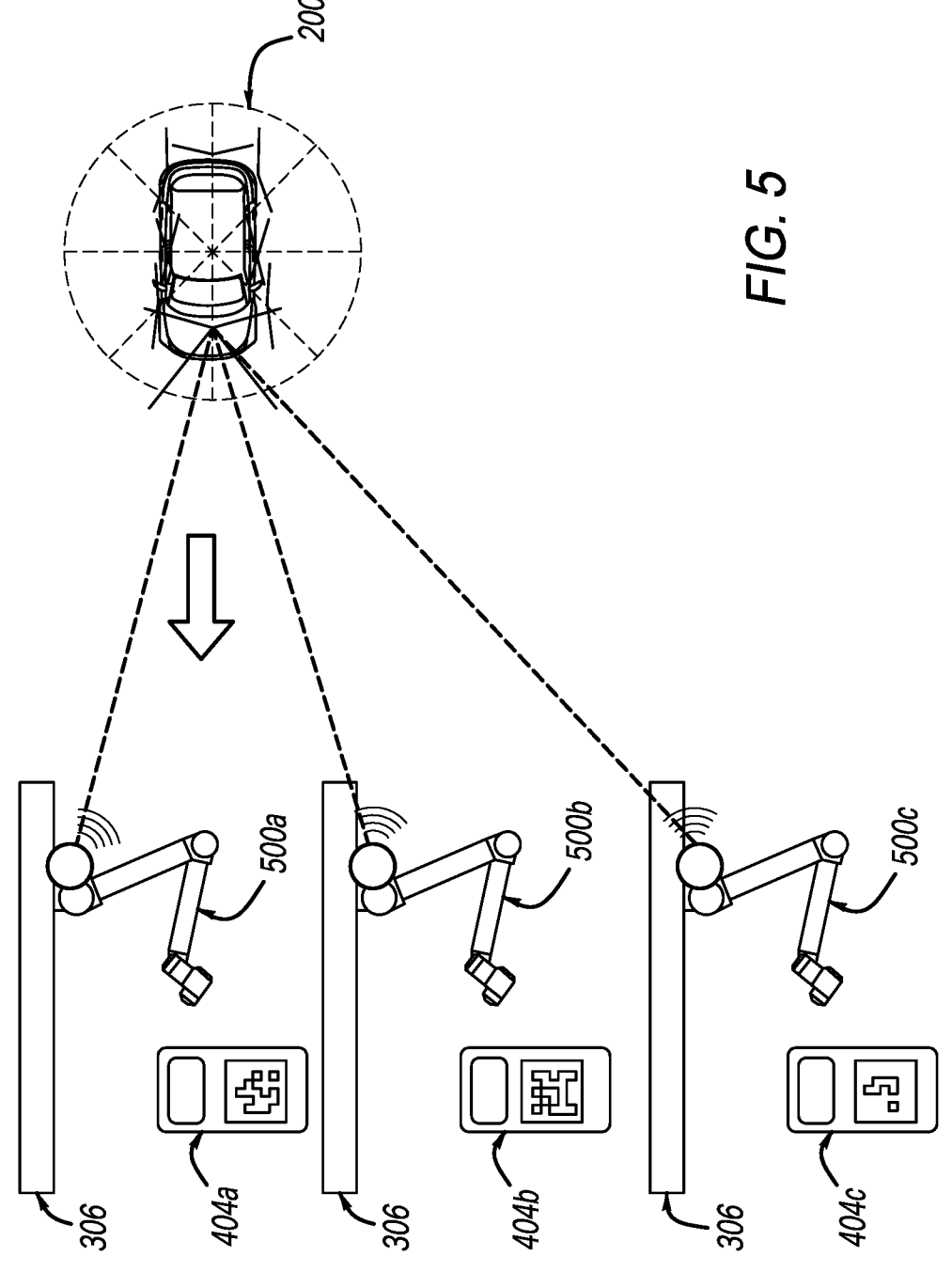
Figure 6:
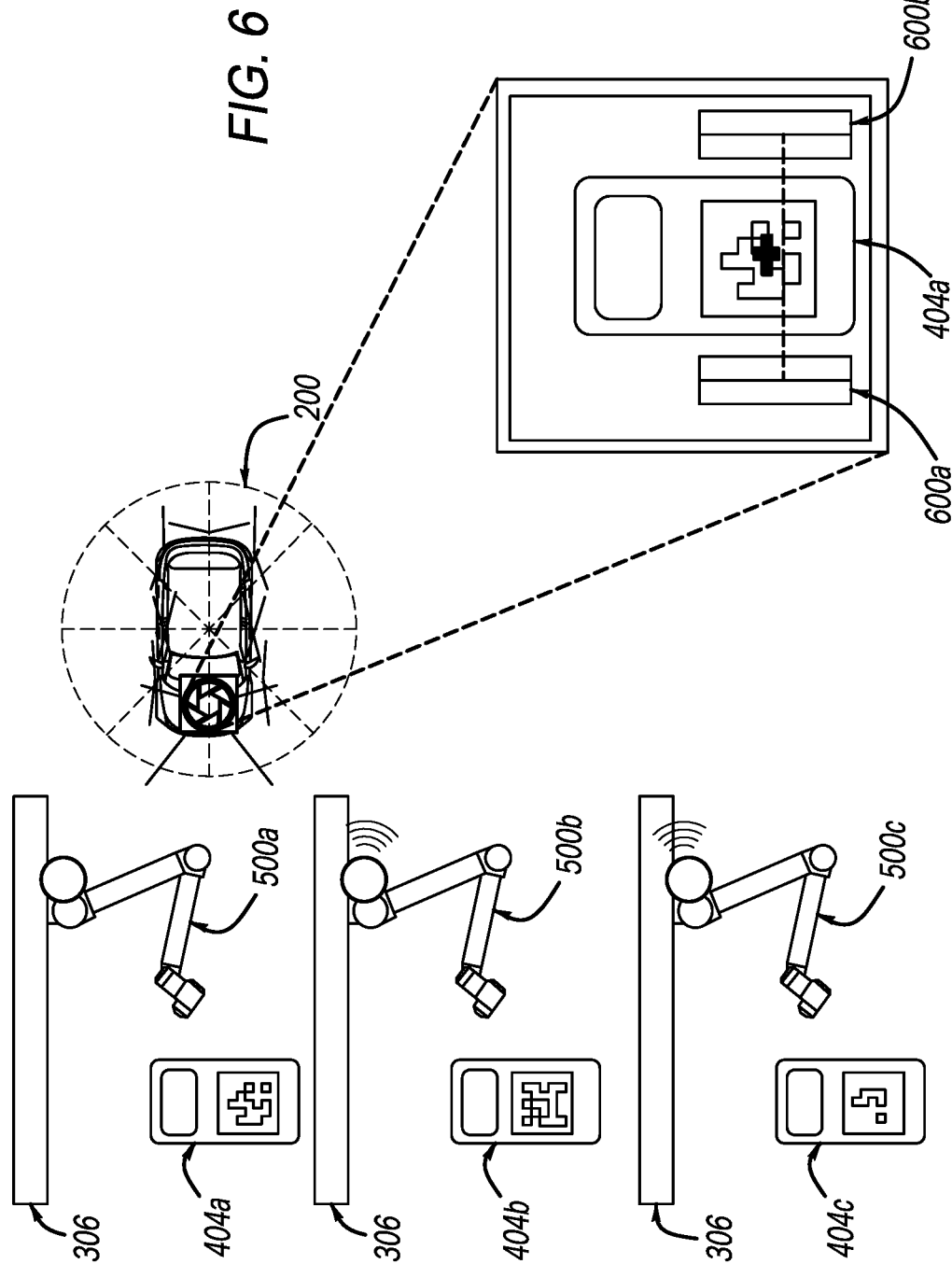
Figure 7:
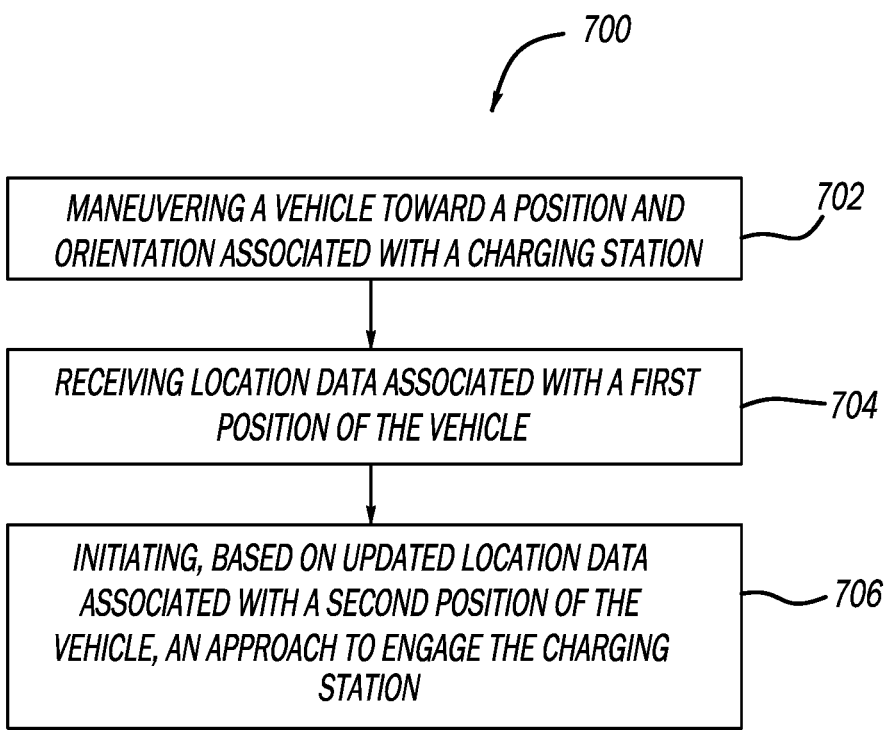
Figure 8:
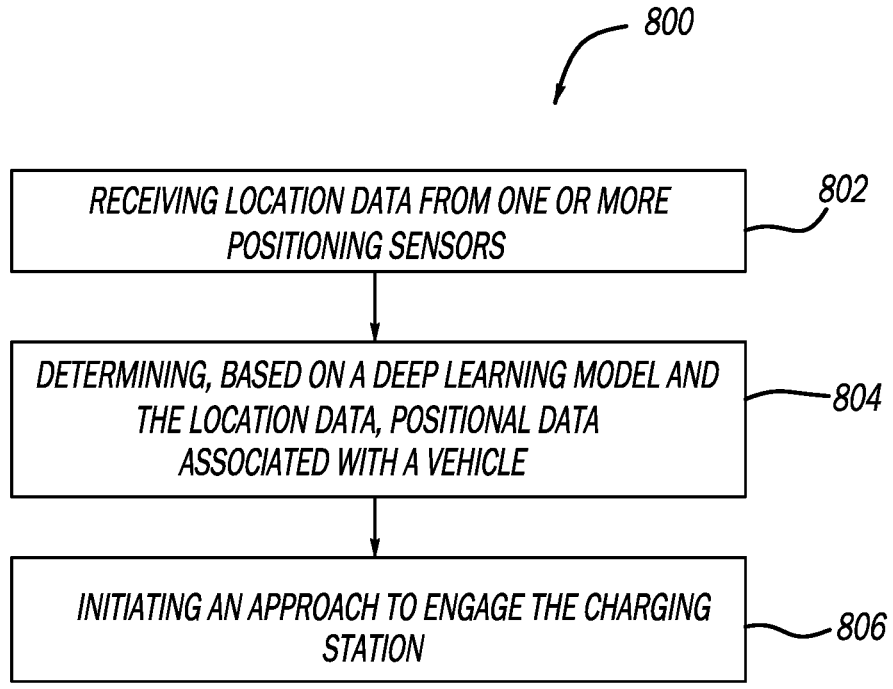

FIG. 7 is a flowchart illustrating an example method for localizing and navigating the vehicle shown in FIGS. 2 and 3 within an engageable distance to the hands-free charging station shown in FIGS. 3-6 in accordance with various implementations; and FIG. 8 is a flowchart illustrating another example method for localizing and navigating the vehicle shown in FIGS. 2 and 3 within an engageable distance to the hands-free charging station shown in FIGS. 3-6 in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for automatically charging one or more vehicles as they are marshaled across an environment such as, for example, a parking lot. In some examples, automated alignment of a vehicle provides a hands-free charging method and system. Such a capability provides a reduction in required manual labor by human operators, as well as a reduced cycle time associated with the one or more vehicles prior to parking.

Particularly, this disclosure provides a system for allowing for the efficient and precise localization of the one or more vehicles as the vehicle(s) engage a hands-free charging (HFC) system. This system reduces cycle time in aligning the one or more vehicles with the HFC system. This system further reduces the reliance on human operators for intervening and/or orienting the one or more vehicles to be placed in an appropriate location for automated charging. This system also provides for more robust outdoor movement of the one or more vehicles through the environment relative to the otherwise limited travel before required human interaction would be required.

Figure 1:
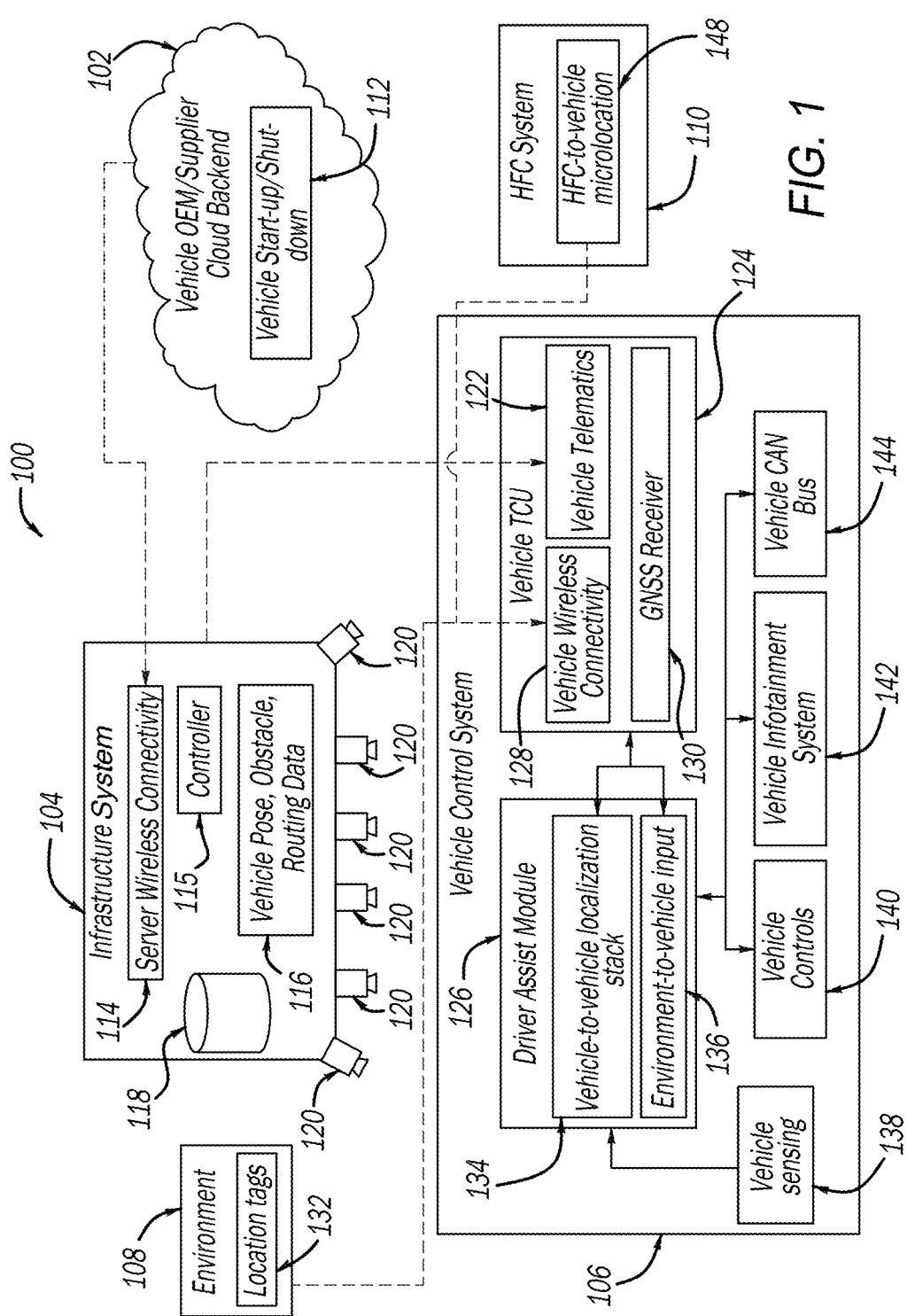
FIG. 1 illustrates an overall system for automated marshaling in accordance with various implementations.

FIG. 1 shows a schematic block diagram illustration of an autonomous vehicle marshaling (AVM) system 100. The AVM system 100, in one or more examples, marshals one or more autonomous vehicles traveling at a low speed, including to an HFC system 110. However, it is understood that the AVM system 100 may marshal one or more vehicles traveling at any speed. It is also understood that the AVM system 100 may marshal semi-autonomous vehicles and/or fully autonomous vehicles.

The AVM system 100 generally includes a vehicle original equipment manufacturer (OEM)/supplier cloud backend system 102, an infrastructure system 104, a vehicle control system 106, an environment 108, and the HFC system 110. The OEM/supplier cloud backend system 102 operates as the central cloud system that manages and/or facilitates a localization and a navigation of one or more autonomous vehicles (e.g., an autonomous vehicle 200). The OEM/supplier cloud backend system 102 is configured to wirelessly communicate with the infrastructure system 104.

The OEM/supplier cloud backend system 102 includes a vehicle start-up/shut-down component 112. The vehicle start-up/shut-down component 112 is configured to cause one or more instructions to be sent to a server wireless connectivity roadside unit (RSU) 114 associated with the infrastructure system 104. For example, the one or more instructions sent to the server wireless connectivity RSU 114 are sent via a cellular-vehicle-to-everything (CV2X) messaging protocol. However, it is understood that the one or more instructions sent to the server wireless connectivity RSU 114 may be sent via any form of messaging such as, but not limited to, a private and/or public cellular protocol, a Wi-Fi protocol, a long range (LoRA) signal protocol, a Bluetooth protocol, and/or a UWB protocol.

As another example, the one or more instructions sent to the server wireless connectivity RSU 114 pertain to start-up/shut-down operations associated with the autonomous vehicle 200. However, it is understood that the vehicle start-up/shut-down component 112 may send any type of instructions to the server wireless connectivity RSU 114. The vehicle start-up/shut-down component 112 is also configured to wirelessly exchange (e.g., send/receive) data with the server wireless connectivity RSU 114 pertaining to start-up/shut-down operations associated with the autonomous vehicle 200. However, it is understood that the vehicle start-up/shut-down component 112 may exchange any type of data with the server wireless connectivity RSU 114.

For example, based on the instructions and/or data exchanged between the vehicle OEM/supplier cloud backend system 102 and the infrastructure system 104 (e.g., via the server wireless connectivity RSU 114) causes the autonomous vehicle 200 to start, stop, or pause progression through the environment 108 (e.g., a parking lot). As another example, based on the instructions and/or data exchanged between the vehicle OEM/supplier cloud backend system 102 and the infrastructure system 104, a marshaling speed of the autonomous vehicle 200 is controlled as the autonomous vehicle 200 traverses the environment 108. As a further example, the instructions and/or data exchanged between the vehicle OEM/supplier cloud backend system 102 and the infrastructure system 104 is based on whether the autonomous vehicle 200 is actively turned-on or shut-down.

The infrastructure system 104 can include the server wireless connectivity RSU 114, a data component 116, a local database 118, and one or more sensors 120. The infrastructure system 104 is configured to wirelessly broadcast one or more instructions directly to a vehicle telematics on-board unit (OBU) 122 of the autonomous vehicle 200 via a CV2X protocol. However, it is understood that the server wireless connectivity RSU 114 may be configured to wirelessly broadcast the one or more instructions directly to the vehicle telematics OBU 122 via any form of messaging such as, but not limited to, a private and/or public cellular protocol, a Wi-Fi protocol, a long range (LoRA) signal protocol, a Bluetooth protocol, and/or a UWB protocol.

For example, the broadcasted one or more instructions may be a forwarding of the one or more instructions associated with the start-up/shut-down operations originated from the vehicle OEM/supplier cloud backend system 102. As an example, the server wireless connectivity RSU 114 may be additionally configured to wirelessly exchange (e.g., send/receive) data with the vehicle telematics OBU 122 via the CV2X protocol. However, it is understood that the server wireless connectivity RSU 114 may be additionally configured to wirelessly exchange data with the vehicle telematics OBU 122 via any messaging means. For example, the exchanged data may be associated with the start-up/shut-down operations of the autonomous vehicle 200 originated from the vehicle OEM/Supplier cloud backend system 102. It is understood that while the server wireless connectivity RSU 114 is a dedicated short-range communications transceiver, one or more RSUs can be utilized throughout a marshaling area so that the range of communication between the server wireless connectivity RSU 114 and the vehicle telematics OBU 122 can be extended. As an example, the infrastructure system 104 (e.g., via the server wireless connectivity RSU 114) may utilize ultra-wide band, Bluetooth®, WIFI, CV2X, a public cellular network, or a private cellular network to communicate with the autonomous vehicle 200 (e.g., via the vehicle telematics OBU 122).

The data component 116 is configured to process the one or more instructions and/or the data received from the vehicle OEM/Supplier cloud backend system 102. As an example, the one or more instructions and/or the data received from the vehicle OEM/Supplier cloud backend system 102 can be one or more various signals that can relate to anything associated with the marshaling of the autonomous vehicle 200. The data component 116 is also configured to process data received from the one or more sensors 120. For example, the data received from the one or more sensors 120 can be related to vehicle pose data, obstacle data, routing data, or a combination thereof. It is understood, however, that the data received from the one or more sensors 120 can relate to anything associated with the marshaling of the autonomous vehicle 200.

The local database 118 is a volatile memory storage component of the infrastructure system 104 that can be, but is not limited to, a random-access memory (RAM). It is understood that the local database 118 can be any type of memory and/or can be a non-volatile memory that permanently stores data. The local database 118 is configured to store any of the data and/or the one or more instructions received from the vehicle OEM/supplier cloud backend system 102, the one or more sensors 120, and/or the autonomous vehicle 200. It is understood, however, that the local database 118 can also store data associated with the marshaling of the autonomous vehicle 200 received from any source(s). The one or more sensors 120 can be, for example, one or more of cameras, lidar, radar, and/or ultrasonic devices. The one or more sensors 120 monitor the movement of the autonomous vehicle 200 as the autonomous vehicle 200 traverses the environment 108.

Additionally, the infrastructure system 104 includes an infrastructure controller 115. The infrastructure controller 115 is configured to centrally control the operation of the autonomous vehicle 200. For example, the operation of the autonomous vehicle 200 includes propulsion, braking, and steering of the autonomous vehicle 200. It is understood that the infrastructure controller 115 may be disposed within the infrastructure system 104 or externally located relative to the infrastructure system 104. For example, in a marshaling environment, the infrastructure system 104 wirelessly broadcasts a marshaling infrastructure-message to the autonomous vehicle 200. As another example, the marshaling infrastructure-message is broadcasted over a vehicle-to-everything (V2X) protocol. However, it is understood that any communication means may be used to broadcast the marshaling infrastructure-message.

The vehicle control system 106 associated with the autonomous vehicle 200 generally includes a vehicle telematics control unit (TCU) 124 and a driver assist module 126. The vehicle TCU 124 includes the vehicle telematics OBU 122 that receives the broadcasted data and/or the one or more instructions from the server wireless connectivity RSU 114, for example. The vehicle TCU 124 also includes a vehicle wireless connectivity interface 128 and a global navigation satellite system (GNSS) receiver 130, in some examples. The vehicle wireless connectivity interface 128 is configured to receive one or more signals from one or more location tags 132 associated with the environment 108 via a cellular means. However, it is understood that the vehicle wireless connectivity interface 128 may wirelessly receive the one or more signals from the one or more location tags 132 via any messaging means. While the vehicle wireless connectivity interface 128 is a logical interface, it is understood that the vehicle wireless connectivity interface 128 can be any type of interface.

The GNSS receiver 130 is communicatively coupled (e.g., wired) to the vehicle telematics OBU 122 and is configured to communicate with one or more satellites (not shown) so that the vehicle control system 106 can determine a specific location of the autonomous vehicle 200. The GNSS receiver 130 is also configured to communicate geographical information associated with the autonomous vehicle 200 to the vehicle telematics OBU 122. For example, the vehicle control system 106 utilizes the vehicle telematics OBU 122 to process and send information received from the GNSS receiver 130 to the infrastructure system 104.

The driver assist module 126 includes a vehicle-to-HFC localization stack component 134 and an environment-to-vehicle input component 136. The vehicle-to-HFC localization stack component 134 is configured to assist in positioning the autonomous vehicle 200 to within an engageable distance relative to a HFC station (e.g., a HFC station 300). The vehicle-to-HFC localization stack component 134 is communicatively coupled (e.g., wired) to both the vehicle TCU 124 and the environment-to-vehicle input component 136. For example, the vehicle-to-HFC localization stack component 134 is configured to communicate (e.g., exchange data) with both the environment-to-vehicle input component 136 and/or the vehicle TCU 124. As another example, the exchanged data may be associated with information received from any of a vehicle sensing component 138, one or more vehicle controls 140, a vehicle infotainment system 142, a vehicle CAN bus 144, or a combination thereof.

The driver assist module 126 is communicatively coupled (e.g., wired) to, and collects data from, the vehicle sensing component 138. For example, the data received from the vehicle sensing component 138 can be associated with environmental conditions such as temperature, an amount of light, and/or distances from any objects relative to the position and/or orientation of the autonomous vehicle 200. As a further example, the vehicle sensing component 138 can include one or more of cameras, lidar, radar, and/or ultrasonic devices. For example, ultrasonic devices utilized as the vehicle sensing component 138 emit a high frequency sound wave that hits an object (e.g., a wall or another vehicle) and is then reflected back to the autonomous vehicle 200. Based on the amount of time it takes for the sound wave to return to the autonomous vehicle 200, the vehicle control system 106 can determine the distance between the autonomous vehicle 200 and the object.

As another example, camera devices utilized as the vehicle sensing component 138 provide a visual indication of a space around the autonomous vehicle 200. As an additional example, radar devices utilized as the vehicle sensing component 138 emit electromagnetic wave signals that hit the object and is then reflected back to the autonomous vehicle 200. Based on the amount of time it takes for the electromagnetic waves to return to the autonomous vehicle 200, the vehicle control system 106 can determine a range, velocity, and/or angle of the autonomous vehicle 200 relative to the object. For example, the vehicle control system 106 utilizes the driver assist module 126 to process and/or send information received from the vehicle sensing component 138 to the infrastructure system 104, via the vehicle TCU 124. As another example, the driver assist module 126 is configured to communicate one or more instructions to the vehicle sensing component 138 received from the infrastructure system 104, via the vehicle TCU 124.

The driver assist module 126 is also communicatively coupled (e.g., wired) to, and collects data from, each of the one or more vehicle controls 140, the vehicle infotainment system 142, and the vehicle CAN bus 144. The one or more vehicle controls 140 can include hybrid turbo engines, electronic engine and gearbox controls, cruise control, antilock brakes, differential braking, active and/or semi-active suspensions, or a combination thereof. However, it is understood that the one or more vehicle controls 140 can include any control-related system associated with the autonomous vehicle 200. For example, the vehicle control system 106 utilizes the driver assist module 126 to process and/or send information received from the one or more vehicle controls 140 to the infrastructure system 104, via the vehicle TCU 124. As another example, the driver assist module 126 is configured to communicate one or more instructions to the one or more vehicle controls 140 received from the infrastructure system 104, via the vehicle TCU 124.

The vehicle infotainment system 142 is a system that delivers a combination of information and entertainment content and/or services to a user of the autonomous vehicle 200. It is understood that the vehicle infotainment system 142 can deliver information services to anyone associated with the autonomous vehicle 200, in other examples. As an example, the vehicle infotainment system 142 includes built-in car computers that combine one or more functions, such as digital radios, built-in cameras, and/or televisions. For example, the vehicle control system 106 utilizes the driver assist module 126 to process and/or send information received from the vehicle infotainment system 142 to the infrastructure system 104, via the vehicle TCU 124. As another example, the driver assist module 126 is configured to communicate one or more instructions to the vehicle infotainment system 142 received from the infrastructure system 104, via the vehicle TCU 124.

The vehicle CAN bus 144 communicates with the driver assist module 126 and is configured to allow any device within the network of the autonomous vehicle 200 to create a data frame that is transmitted, such as transmitted sequentially. For example, the vehicle CAN bus 144 is configured to prioritize further distribution of transmission received from different components within the autonomous vehicle 200. As another example, the vehicle CAN bus 144 organizes the transmission(s) received from the different components within the autonomous vehicle 200 so that a limited amount of transmitted data is distributed at a single time. While the vehicle CAN bus 144 is communicatively coupled to the driver assist module 126, it is understood that the vehicle CAN bus 144 can communicate with any number of components within the autonomous vehicle 200. For example, the vehicle control system 106 utilizes the driver assist module 126 to process and/or send information received from the vehicle CAN bus 144 to the infrastructure system 104, via the vehicle TCU 124. As another example, the driver assist module 126 is configured to communicate one or more instructions to the vehicle CAN bus 144 received from the infrastructure system 104, via the vehicle TCU 124.

The environment 108 includes, but is not limited to, the parking lot, for example. The environment 108 further includes one or more location tags 132. The one or more location tags 132 can include any type of geolocation sensing device such as pressure sensors, magnets, ultrasonics, proximity sensors, ultra-wide band tags, RFID tags, or a combination thereof, among others. As a further example, the one or more location tags 132 are configured to sense the autonomous vehicle 200 as the autonomous vehicle 200 travels over and/or within proximity of any of the one or more location tags 132. The environment 108 wirelessly communicates with the vehicle wireless connectivity interface 128 via a cellular means. However, it is understood that the environment 108 may wirelessly communicate with the vehicle wireless connectivity interface 128 via any messaging means. For example, the one or more location tags 132 can cause the environment 108 to communicate location data to the vehicle wireless connectivity interface 128, which causes the vehicle control system 106 to make one or more directional adjustments to a direction of travel associated with the autonomous vehicle 200 as the autonomous vehicle 200 is guided to the HFC station 300 associated with the HFC system 110.

The HFC system 110 includes an HFC-to-vehicle micro-location component 148. The HFC system 110 wirelessly communicates with the autonomous vehicle 200 via a cellular means, in some examples. However, it is understood that the HFC system 110 may wirelessly communicate with the autonomous vehicle 200 via any messaging means such as a CV2X protocol, for example. It is understood that the HFC system 110 can wirelessly communicate with the infrastructure system 104 and/or the environment 108 as well via a cellular means. However, it is understood that the HFC system 110 may wirelessly communicate with the infrastructure system 104 and/or the environment 108 via any messaging means. The HFC-to-vehicle micro-location component 148 is configured to communicate with the HFC station 300. For example, the HFC-to-vehicle micro-location component 148 is configured to guide the autonomous vehicle 200 to the engageable distance relative to the HFC station 300 based on the communication with the HFC station 300. As another example, the engageable distance relative to the HFC station 300 is indicative of a distance sufficient enough for the autonomous vehicle 200 to interact (e.g., charge) with the HFC station 300. As a further example, the HFC system 110 is further configured to wirelessly communicate one or more relocation instructions to the vehicle TCU 124 and/or the vehicle wireless connectivity interface 128, which causes the vehicle control system 106 to make one or more directional adjustments to the direction of travel associated with the autonomous vehicle 200 as the autonomous vehicle 200 is guided to the HFC station 300.

Referring to FIG. 2, in various forms, the autonomous vehicle 200 may be powered in a variety of ways, for example, with an electric motor and/or an internal combustion engine. The autonomous vehicle 200 may be any type of vehicle powered by an electric motor and/or an internal combustion engine such as a car, a truck, a robot, a plane and/or a boat, as non-limiting examples. The autonomous vehicle 200 can include a vehicle controller 201, one or more actuators 202, a plurality of on-board sensors 204, and a human machine interface (HMI) 206. The autonomous vehicle 200 also has a reference point 208, that is, a specified point within the space defined by a vehicle body, for example, a geometrical center point at which respective longitudinal and lateral center axes of the autonomous vehicle 200 intersects. The reference point 208 identifies the location of the autonomous vehicle 200, for example, a point at which the autonomous vehicle 200 is located as the autonomous vehicle 200 navigates toward a waypoint.

The vehicle controller 201, in some examples, is configured or programmed to control the operation of the brakes, propulsion (e.g., control of acceleration in the autonomous vehicle 200 by controlling one or more of an internal combustion engine, electric motor, hybrid engine, etc.), steering, climate control, interior and/or exterior lights, etc. of the autonomous vehicle 200, as well as to determine whether and when the vehicle controller 201, as opposed to a human operator, is to control such operations. It is understood that any of the operations associated with the autonomous vehicle 200 may be facilitated via an automated, a semi-automated, or a manual mode. For example, the automated mode may facilitate for any of the operations to be fully controlled by the vehicle controller 201 without the aid of a user. As another example, the semi-automated mode may facilitate for any of the operations to be at least partially controlled by the vehicle controller 201 and/or the user. As a further example, the manual mode may facilitate any of the operations being fully controlled by the user.

The vehicle controller 201 includes or may be communicatively coupled to (e.g., via a vehicle communications bus) one or more processors, for example, controllers or the like included in the autonomous vehicle 200 for monitoring and/or controlling various vehicle controllers, such as a powertrain controller, a brake controller, a steering controller, etc. The vehicle controller 201 is generally arranged for communications on a vehicle communication network that can include a bus in the autonomous vehicle 200 such as a CAN or the like, and/or other wired and/or wireless mechanisms.

The vehicle controller 201 transmits messages, via a vehicle network, to various devices in the autonomous vehicle 200 and/or receives messages from the various devices, for example, the one or more actuators 202, the HMI 206, etc. Alternatively, or additionally, in cases where the vehicle controller 201 includes multiple devices, the vehicle communication network is utilized for communications between devices represented as the vehicle controller 201. Further, as discussed below, various other controllers and/or sensors provide data to the vehicle controller 201 via the vehicle communication network.

In addition, the vehicle controller 201 is configured for communicating through a wireless vehicular communication interface with other traffic objects (e.g., vehicles, infrastructures, pedestrians, etc.), such as, via a vehicle-to-vehicle communication network. The vehicle controller 201 is also configured for communicating through a vehicle-to-infrastructure communication network, such as communicating with the infrastructure controller 115 of the infrastructure system 104. The vehicular communication network represents one or more mechanisms by which the vehicle controller 201 of any of the autonomous vehicle 200 communicates with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized), Examples of vehicular communication networks include, among others, cellular, Bluetooth, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The vehicle actuators 202 may be used to control braking, acceleration, and/or steering of the autonomous vehicle 200. The vehicle controller 201 can be programmed to actuate the vehicle actuators 202 including propulsion, steering, and/or braking based on the planned acceleration or deceleration of the autonomous vehicle 200.

The plurality of on-board sensors 204 include a variety of devices to provide data to the vehicle controller 201. For example, the plurality of on-board sensors 204 may include object detection sensors such as lidar sensor(s) disposed on or in the autonomous vehicle 200 that provide relative locations, sizes, and shapes of one or more targets surrounding the autonomous vehicle 200, for example, additional vehicles, bicycles, pedestrians, robots, drones, etc., traveling next to, ahead, and/or behind the autonomous vehicle 200. As another example, one or more of the sensors can be radar sensors affixed to one or more bumpers of the autonomous vehicle 200 that may provide locations of the target(s) relative to the location of each of the autonomous vehicle 200.

The object detection sensors may include a camera sensor, for example, to provide a front view, side view, rear view, etc., providing images from an area surrounding the autonomous vehicle 200. For example, the vehicle controller 201 may be programmed to receive sensor data from a camera sensor(s) and to implement image processing techniques to detect a road, infrastructure elements, etc. The vehicle controller 201 may be further programmed to determine a current vehicle location based on location coordinates, for example, GPS coordinates, received from the autonomous vehicle 200 and indicative of a location of the autonomous vehicle 200 from a GPS sensor.

The HMI 206 is configured to receive information from a user, such as a human operator, during operation of the autonomous vehicle 200. Moreover, the HMI 206 is configured to present information to the user, such as, an occupant of the autonomous vehicle 200. In some variations, the vehicle controller 201 is programmed to receive destination data, for example, location coordinates, from the HMI 206.

Accordingly, the autonomous vehicle 200 can be autonomously guided toward a waypoint using a combination of the one or more sensors 120 and the vehicle sensors (e.g., the plurality of on-board sensors 204). Routing can be done using vehicle location, distance to travel, queue in line for vehicle marshaling, etc. In the instance wherein the autonomous vehicle 200 requires additional charge/fuel, the autonomous vehicle 200 can be prepped ahead of joining a queue of a plurality of autonomous vehicles. In the instance wherein each of the autonomous vehicle 200 and the plurality of autonomous vehicles are destined toward the same waypoint, each of the autonomous vehicle 200 and the plurality of autonomous vehicles operate in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of each of the autonomous vehicle 200 and the plurality of autonomous vehicles being controlled (e.g., current location, destination, special notes, etc.), which adds accountability and traceability to the distribution process. The fleet-management is coordinated within and/or across sites to optimize delivery timing of the autonomous vehicle 200 and/or each of the plurality of autonomous vehicles to the waypoint. Several logistics applications can be used, which may involve a combination of an infrastructure system (e.g., the infrastructure system 104) integrated with a traffic-management algorithm to queue and deconflict vehicles in real-time. Accordingly, the fleet-management application queues the autonomous vehicle 200 and the plurality of autonomous vehicles based on unique characteristics (e.g., how far does a particular vehicle of the plurality of autonomous vehicles need to travel, what traffic is along the route, when does the particular vehicle of the plurality of autonomous vehicles need to get to a particular location to line up in the correct order, etc.).

FIG. 3 illustrates a general engagement of the autonomous vehicle 200 with the HFC station 300. The HFC station 300 is generally comprised of a one or more charging hubs 302, an arm 304 associated with the one or more charging hubs 302, and a mobile base 306.

Figure 4:
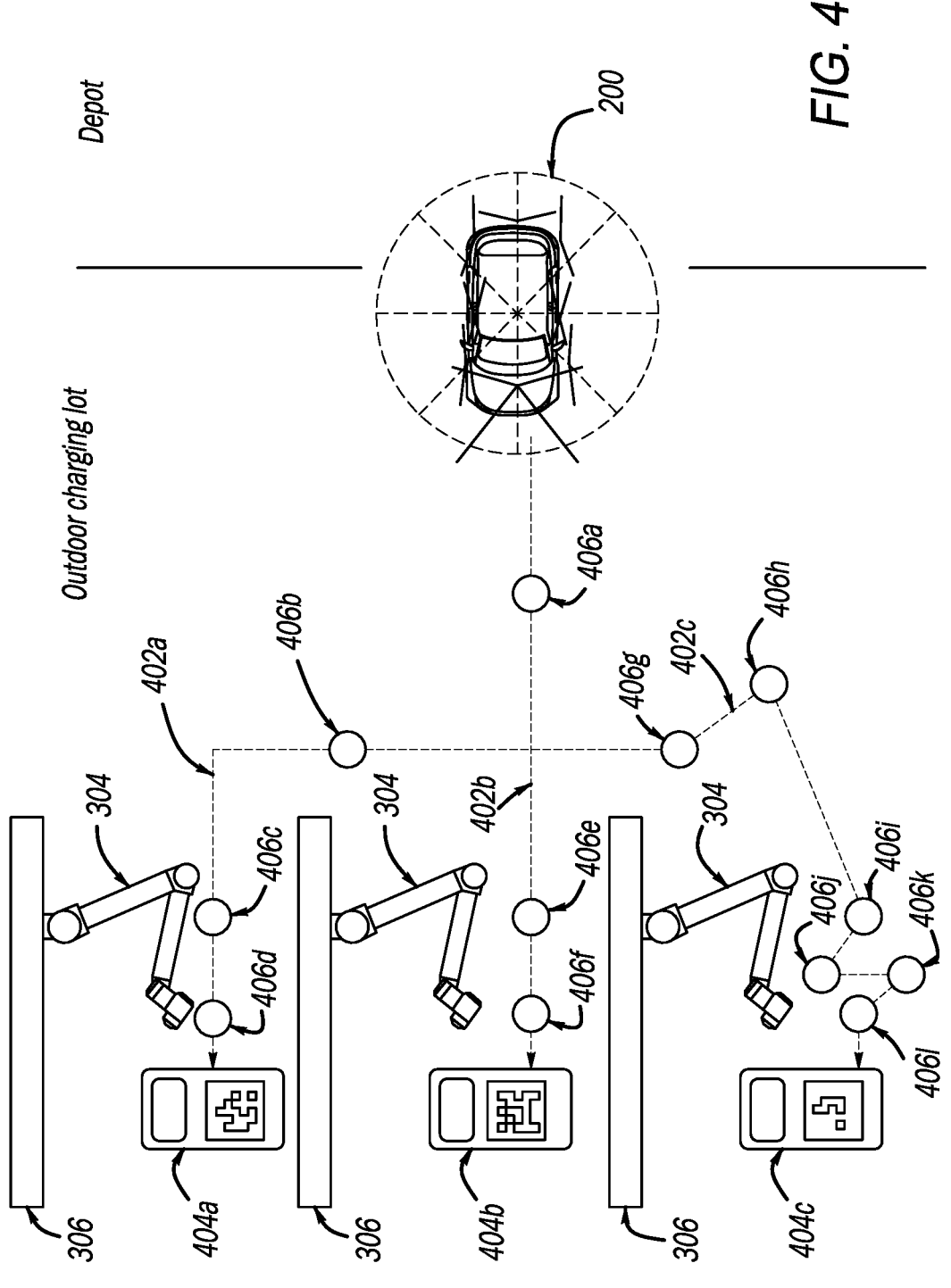
FIGS. 4-6 illustrate example alignment processes the vehicle shown in FIGS. 2 and 3 undergoes as the vehicle approaches the hands-free charging station shown in FIG. 3 in accordance with various implementations.

Referring to FIG. 4, the autonomous vehicle 200 is depicted in an instance wherein the autonomous vehicle 200 has exited a manufacturing facility (e.g., a depot) and has entered the environment 108. For example, the infrastructure system 104 transmits one or more marshaling instructions to the autonomous vehicle 200 as the autonomous vehicle 200 exits the manufacturing facility. However, it is understood that the infrastructure system 104 can transmit the one or more marshaling instructions to the autonomous vehicle 200 at any time, as often as is necessary, and/or as long as the autonomous vehicle 200 is within range of the infrastructure system 104. As another example, the one or more marshaling instructions direct the autonomous vehicle 200 toward a general location of the HFC station 300. As a further example, the autonomous vehicle 200 utilizes the GNSS receiver 130 to navigate the environment 108 before the autonomous vehicle 200 enters a communication-range of any of the one or more location tags 132. However, it is understood that the GNSS receiver 130 may navigate the environment 108 regardless of whether the autonomous vehicle 200 is within communication-range of the one or more location tags 132. As yet another example, the GNSS receiver 130 is able to navigate the environment 108 based on the one or more marshaling instructions received from the infrastructure system 104.

The environment 108, in this particular example 400, illustrates one or more pathways 402a-402c the autonomous vehicle 200 may follow to arrive at one or more charging hubs 404a-404c (e.g., the one or more charging hubs 302). For example, the pathway 402a shows that the autonomous vehicle 200 would travel over one or more in-ground location tags 406a-406d (e.g., the one or more location tags 132) to arrive at the charging hub 404a. In the instance wherein the autonomous vehicle 200 follows the pathway 402a, the autonomous vehicle 200 first travels over the in-ground location tag 406a and continues traveling in a straight line past the in-ground location tag 406a. As the autonomous vehicle 200 travels to within a proximity of the in-ground location tag 406b, the in-ground location tag 406b senses the presence of the autonomous vehicle 200 and communicates location data to the autonomous vehicle 200. Based on the receipt of the location data received from the in-ground location tag 406b, the vehicle control system 106 makes one or more directional adjustments to the direction of travel associated with the autonomous vehicle 200 so that the autonomous vehicle 200 ultimately travels over the in-ground location tag 406b and continues traveling in a straight line past the in-ground location tag 406b.

As the autonomous vehicle 200 travels to within a proximity of the in-ground location tag 406c, the in-ground location tag 406c senses the presence of the autonomous vehicle 200 and communicates location data to the autonomous vehicle 200. Based on the receipt of the location data received from the in-ground location tag 406c, the vehicle control system 106 makes one or more directional adjustments to the direction of travel associated with the autonomous vehicle 200 so that the autonomous vehicle 200 ultimately travels over the in-ground location tag 406c and continues traveling in a straight line past the in-ground location tag 406c. The autonomous vehicle 200 continues traveling in a straight line past the in-ground location tag 406d and toward an engageable distance to the charging hub 404a. For example, the engageable distance is a distance relative to the charging hub 404a sufficient enough for the autonomous vehicle 200 to interact (e.g., charge) with the charging hub 404a.

As another example, the pathway 402b shows that the autonomous vehicle 200 would travel over one or more in-ground location tags 406a, 406e, and 406f (e.g., the one or more location tags 132) to arrive at the charging hub 404b. In the instance wherein the autonomous vehicle 200 follows the pathway 402b, the autonomous vehicle first travels over the in-ground location tag 406a and continues traveling in a straight line past the in-ground location tag 406a. The autonomous vehicle 200 continues traveling in a straight line past both the in-ground location tags 406e and 406f and toward an engageable distance to the charging hub 404b. For example, the engageable distance is a distance relative to the charging hub 404b sufficient enough for the autonomous vehicle 200 to interact (e.g., charge) with the charging hub 404b.

As an additional example, the pathway 402c shows that the autonomous vehicle 200 would travel over one or more in-ground location tags 406a and 406g-406l (e.g., the one or more location tags 132) to arrive at the charging hub 404c. In the instance wherein the autonomous vehicle 200 follows the pathway 402c, the autonomous vehicle 200 first travels over the in-ground location tag 406a. As the autonomous vehicle 200 travels to within a proximity of the in-ground location tag 406g, the in-ground location tag 406g senses the presence of the autonomous vehicle 200 and communicates location data to the autonomous vehicle 200. Based on the receipt of the location data received from the in-ground location tag 406g, the vehicle control system 106 makes one or more directional adjustments to the direction of travel associated with the autonomous vehicle 200 so that the autonomous vehicle 200 ultimately travels over the in-ground location tag 406g and continues traveling in a straight line past the in-ground location tag 406g.

As the autonomous vehicle 200 travels to within a proximity of the in-ground location tag 406h, the in-ground location tag 406h senses the presence of the autonomous vehicle 200 and communicates location data to the autonomous vehicle 200. Based on the receipt of the location data received from the in-ground location tag 406h, the vehicle control system 106 makes one or more directional adjustments to the direction of travel associated with the autonomous vehicle 200 so that the autonomous vehicle 200 ultimately travels over the in-ground location tag 406h and continues traveling in a straight line past the in-ground location tag 406h. The autonomous vehicle 200 continues traveling in a straight line up until the in-ground location tag 406i and toward an engageable distance to the charging hub 404c. In the instance wherein the autonomous vehicle 200 is positioned within proximity of the in-ground location tag 406i, the autonomous vehicle 200 is also within proximity of the in-ground location tags 406j-406l. It is understood that the location data received from multiple in-ground location tags disposed within close proximity to one another (e.g., the in-ground location tags 406j-406l) allows for a finer-alignment of the autonomous vehicle 200 than if the in-ground location tags are disposed farther away from one another. In this particular example, the cluster of in-ground location tags 406i-406l is configured to communicate location data to the autonomous vehicle 200 so that the vehicle control system 106 may make one or more directional adjustments, such that the autonomous vehicle 200 may be finely positioned to within an engageable distance to the charging hub 404c. For example, the engageable distance is a defined or required distance relative to the charging hub 404c sufficient enough for the autonomous vehicle 200 to interact (e.g., charge) with the charging hub 404c.

In each instance wherein the autonomous vehicle 200 follows any of the pathways 402a-402c, it is understood that all of the in-ground location tags 406a-406l are configured to transmit one or more instructions to the autonomous vehicle 200 associated with localization, re-localization, and navigation of the autonomous vehicle 200 relative to an approach to any of the charging hubs 404a-404c.

It is also understood that any of the in-ground location tags 406a-406l can represent a checkpoint along any of the pathways 402a-402c. It is further understood that each of the in-ground location tags 406a-406c provide the vehicle control system 106 with a decision point regarding whether to cause the autonomous vehicle 200 to change direction (e.g., at any angle such as a 45-degree angle or a 60-degree angle) or remain straight with respect to each of the pathways 402a-402c. It is additionally understood that each of the in-ground location tags 406a-406l can aid the autonomous vehicle 200 in both longitudinal and lateral adjustments as the autonomous vehicle 200 approaches any of the charging hubs 404a-404c. As another example, the autonomous vehicle 200 can be navigated (e.g., given one or more instructions) to follow a particular pathway of any of the pathways 402a-402c. Along the particular pathway, the autonomous vehicle 200 may be localized, and/or re-localized, as the autonomous vehicle 200 travels past any of the checkpoints (e.g., any of the in-ground location tags 406a-406l).

FIG. 5 depicts one or more arms 500a-500c (e.g., the arm 304) associated with each of the charging hubs 404a-404c. Each of the one or more arms 500a-500c are disposed within the HFC station 300. In addition, the HFC station 300 also includes one or more sensing components (not shown) providing the HFC station 300 with sensing capabilities that provide additional feedback to the autonomous vehicle 200 regarding whether the autonomous vehicle 200 should move laterally and/or longitudinally in relation to the pose (e.g., the position and orientation) of the HFC station 300 and a particular charging hub of the one or more charging hubs 404a-404c. For example, the HFC station 300 can include ultrasonic sensing components, radar-capable sensors, cameras, or a combination thereof. The HFC station 300 can utilize WiFi and/or Bluetooth® to provide the additional feedback to the autonomous vehicle 200. For example, the HFC station 300 can implement trilateration methods via ultrasonics, Bluetooth®, WiFi, and/or proximity sensors to provide location data to the autonomous vehicle 200 relative to the HFC station 300 and a particular charging hub of the one or more charging hubs 404a-404c. Once the autonomous vehicle 200 is caused to move within a prespecified distance to a particular charging hub (e.g., the one or more charging hubs 404a-404c) of the HFC station 300, a particular arm of the one or more arms 500a-500c is able to plug a charger (e.g., a charger 312) into a charging port (e.g., a charging port 310) of the autonomous vehicle 200. For example, the defined (e.g., prespecified) distance to the particular charging hub is a range acceptable for the particular arm of the one or more arms 500a-500c to be able to plug the charger 312 into the charging port 310 of the autonomous vehicle 200.

FIG. 6 depicts an exploded view showing a set of wheel chocks 600a, 600b of the charging hub 404a. The autonomous vehicle 200 can implement one or more methods to detect the charging hub 404a associated with the HFC station 300. More specifically, in some examples, the autonomous vehicle 200 employs the use of a deep learning model to detect the charging hub 404*a* associated with the HFC station 300. For example, the autonomous vehicle 200 employs the use of a deep learning model to detect the charging hub 404*a* associated with the HFC station 300 based on a front windshield camera (not shown) of the autonomous vehicle 200 and/or a rear windshield camara (not shown) of the autonomous vehicle 200. It is further understood that the autonomous vehicle 200 may employ the use of the deep learning model to detect either of the charging hubs 404*b* and 404*c* as well.

The autonomous vehicle 200 may also employ the use of one or more sensing components (e.g., the plurality of on-board sensors 204) including ultrasonic sensing components, radar-capable sensors, and/or cameras onboard the autonomous vehicle 200 to identify one or more landmarks associated with the charging hub 404*a* associated with the HFC station 300. The autonomous vehicle 200 may also employ the use of ultrasonic sensing components, radar-capable sensors, and/or cameras onboard the autonomous vehicle 200 to identify one or more fiducials associated with the charging hub 404*a* associated with the HFC station 300. It is further understood that the autonomous vehicle 200 may employ the use of one or more sensing components to detect either of the charging hubs 404*b* and 404*c* as well.

The autonomous vehicle 200 may additionally employ the use of a strategy wherein at least two of the wheels of the autonomous vehicle 200 may be aligned with the set of wheel chocks 600*a*, 600*b* to navigate the autonomous vehicle within a close proximity (e.g., 5-10 centimeters) to the charging hub 404*a*. However, it is understood that any number of wheels (e.g., one wheel) of the autonomous vehicle 200 may align with either of the set of wheel chocks 600*a*, 600*b*, for example. It is further understood that each of the charging hubs 404*b* and 404*c* may also utilize a set of wheel chocks to aid in the alignment of the autonomous vehicle 200.

In some examples, the utilization of the deep learning model, the one or more sensing components, and the set of wheel chocks 600*a*, 600*b* can each be used as a process to align the autonomous vehicle 200 within a range acceptable for the arm 500*a* associated with the charging hub 404*a* of the HFC station 300 to be able to plug the charger 312 into the charging port 310 of the autonomous vehicle 200. However, it is also understood that the each of the deep learning model, the one or more sensing components, and the set of wheel chocks 600*a*, 600*b* may be utilized separately to align the autonomous vehicle 200 within a range acceptable for the arm 500*a* associated with the charging hub 404*a* of the HFC station 300 to be able to plug the charger 312 into the charging port 310 of the autonomous vehicle 200.

As an example alignment process, the deep learning model is configured to recognize the charging hub 404*a* of the HFC station 300. The one or more sensing components are configured to recognize a center of a fiducial (e.g., a visual marker or a physical marker or other identifier) associated with the charging hub 404*a* of the HFC station 300. The center of the fiducial is transformed from a HFC coordinate frame to a vehicle coordinate frame. The vehicle coordinate frame is used to estimate the positioning of the autonomous vehicle 200 relative to the charging hub 404*a*. The estimation of the positioning of the autonomous vehicle 200 is used to route the autonomous vehicle 200 to a particular destination (e.g., the charging hub 404*a*).

Referring back to FIG. 3, the autonomous vehicle 200 is depicted as positioned within an engageable distance from a particular charging hub of the HFC station 300. At the instance wherein the autonomous vehicle 200 is positioned within the engageable distance from the particular charging hub by using any, or a combination, of the methods described in FIGS. 4-6, the mobile base 306 is configured to move across a support structure 308 of the HFC station 300 to position the arm 304 adjacent to the charging port 310 of the autonomous vehicle 200. Once the arm 304 is positioned adjacent to the charging port 310, the arm 304 is configured to place the charger 312 within the charging port 310 of the autonomous vehicle 200 using any suitable hands-free charging process or technique.

FIG. 7 is a flowchart illustrating an example method 700 for facilitating the localization and navigation of a marshaled vehicle (e.g., the autonomous vehicle 200). At operation 702, the vehicle is maneuvered toward a position and/or orientation associated with a charging station (e.g., the HFC station 300). For example, the vehicle is maneuvered toward the position and/or orientation associated with the charging station by a vehicle control system (e.g., the vehicle control system 106). As another example, the maneuvering of the vehicle toward the position and/or orientation associated with the charging station is based on one or more instructions received from an infrastructure system (e.g., the infrastructure system 104). As an additional example, the position is a global coordinate position.

In one example, positional data associated with a first position and/or a second position of the vehicle is determined. For example, the positional data is based on one or more of: a deep learning model used to detect the charging station via a camera associated with the vehicle; a fiducial associated with the charging station identified via the camera, ultrasonics, or radar associated with the vehicle; or an alignment with a wheel chock and at least one wheel of the vehicle. As another example, the alignment with the wheel chock and the at least one wheel of the vehicle guides the vehicle to within a prespecified distance to the charging station, and wherein the prespecified distance to the charging station is within a range acceptable for an arm (e.g., the arm 304) associated with the charging station to be able to plug a charger (e.g., the charger 312) into a charging port (e.g., the charging port 310) of the vehicle.

At operation 704, location data associated with the first position of the vehicle is received. For example, the location data is received from one or more positioning sensors (e.g., the one or more location tags 132). As another example, the one or more positioning sensors include pressure sensors, magnets, ultrasonics, proximity sensors, ultra-wide band tags, RFID tags, or a combination thereof.

At operation 706, an approach to engage the charging station is initiated. For example, the initiation of the approach to engage the charging station is based on updated location data associated with the second position of the vehicle. As another example, the updated location data is received from the one or more positioning sensors. As yet another example, the updated location data is based on the location data. As a further example, the location data and the updated location data are received via one or more of: ultra-wide band, Bluetooth®, WIFI, CV2X, a public cellular network, or a private cellular network.

In some examples, a determination regarding whether a direction of travel associated with the vehicle is outside an engageable distance from the charging station is made. For example, the determination of whether a direction of travel associated with the vehicle is outside an engageable distance from the charging station is based on the location data. The vehicle is re-localized based on the determination that the direction of travel associated with the vehicle is outside the engageable distance from the charging station. For example, the re-localized vehicle is re-directed toward the engageable distance from the charging station.

FIG. 8 is a flowchart illustrating another example method 800 for facilitating for the localization and navigation of a marshaled vehicle (e.g., the autonomous vehicle 200). At operation 802, location data is received from one or more positioning sensors (e.g., the one or more location tags 132). For example, the one or more positioning sensors include pressure sensors, magnets, ultrasonics, proximity sensors, ultra-wide band tags, RFID tags, or a combination thereof. As another example, the location data is received via one or more of: ultra-wide band, Bluetooth®, WIFI, CV2X, a public cellular network, or a private cellular network.

At operation 804, positional data associated with the vehicle is determined. For example, the determination of the positional data associated with the vehicle is based on a deep learning model and/or the location data. As another example, the deep learning model is used to detect a charging station (e.g., the HFC station 300) via a camera (e.g., the plurality of on-board sensors 204) associated with the vehicle. As yet another example, the determination of the positional data associated with the vehicle is made by a vehicle control system (e.g., the vehicle control system 106). As a further example, positional data is associated with a position of the vehicle. As an additional example, the position is a global coordination position.

At operation 806, an approach to engage the charging station is initiated. For example, the approach to engage the charging station is initiated based on the positional data and/or an identification of the charging station. In an embodiment, the positional data is determined based on one or more of a fiducial associated with the charging station, identified via the camera, ultrasonics, radar associated with the vehicle, and/or an alignment with a wheel chock and at least one wheel of the vehicle. For example, the alignment with the wheel chock and the at least one wheel of the vehicle guides the vehicle to within a prespecified distance to the charging station, and wherein the prespecified distance to the charging station is within a range acceptable for an arm (e.g., the arm 304) associated with the charging station to be able to plug a charger (e.g., the charger 312) into a charging port (e.g., the charging port 310) of the vehicle. In some examples, a database stores vehicle specific information, such as charging port location, charger requirements, charging configuration, etc. that is used to determine the prespecified distance or other parameters used for automated charging using the HFC station.

To summarize, one or more examples provide a means for the localization and navigation of one or more autonomous vehicles as the one or more vehicles are marshaled toward an HFC station. For example, the localization and navigation of the one or more autonomous vehicles may be generally accomplished by a vehicle-augmented maneuvering across an environment via physical environment feedback to provide fine localization of the position of the one or more autonomous vehicles, HFC-to-vehicle communication for guidance of the one or more autonomous vehicles, and/or vehicle-to-HFC detection to initiate positional approach of the one or more autonomous vehicles to the HFC station.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of marshaling an autonomously operated vehicle, the method comprising:

maneuvering, by a vehicle control system, the vehicle toward a position and orientation associated with a charging station, wherein the maneuvering of the vehicle toward the position and orientation associated with the charging station is based on one or more instructions received from an infrastructure system;

receiving, from one or more in-ground positioning sensors over which the vehicle travels, location data associated with a first position of the vehicle; and initiating, based on updated location data associated with a second position of the vehicle, an approach to engage the charging station, wherein the updated location data is received from the one or more in-ground positioning sensors, and wherein the updated location data is based on the location data.

2. The method of claim 1, further comprising:

determining, based on the location data, that a direction of travel associated with the vehicle is outside an engageable distance from the charging station; and re-localizing, based on the determination that the direction of travel associated with the vehicle is outside the engageable distance from the charging station, the vehicle, wherein the re-localized vehicle is re-directed toward the engageable distance from the charging station.

3. The method of claim 1, wherein the position associated with the charging station is a global coordinate position and the one or more in-ground positioning sensors include pressure sensors, magnets, ultrasonics, proximity sensors, ultra-wide band tags, RFID tags, or a combination thereof.

4. The method of claim 1, wherein the location data and the updated location data are received via one or more of: ultra-wide band, Bluetooth®, WIFI, CV2X, a public cellular network, or a private cellular network.

5. The method of claim 1, wherein maneuvering the vehicle toward the position and orientation associated with the charging station further comprises:

determining positional data associated with the first position and the second position of the vehicle.

6. The method of claim 5, wherein the positional data is based on one or more of: a deep learning model used to detect the charging station via a camera associated with the vehicle; a fiducial associated with the charging station identified via the camera, ultrasonics, or radar associated with the vehicle; or an alignment with a wheel chock and at least one wheel of the vehicle.

7. The method of claim 6, wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle.

8. A method of marshaling an autonomously operated vehicle, the method comprising:

receiving location data from one or more in-ground positioning sensors over which the vehicle travels;

determining, based on a deep learning model and the location data, positional data associated with the vehicle, wherein the deep learning model is used to detect a charging station via a camera associated with the vehicle, wherein the determination of the positional data associated with the vehicle is made by a vehicle control system;

initiating, based on the positional data and an identification of the charging station, an approach to engage the charging station; and maneuvering the vehicle, by a vehicle control system, toward a position and orientation associated with the charging station based on one or more instructions received from an infrastructure system.

9. The method of claim 8, wherein the positional data is associated with a position of the vehicle and the position is a global coordinate position.

10. The method of claim 8, wherein the one or more in-ground positioning sensors include pressure sensors, magnets, ultrasonics, proximity sensors, ultra-wide band tags, RFID tags, or a combination thereof.

11. The method of claim 8, wherein the location data is received via one or more of: ultra-wide band, Bluetooth®, WIFI, CV2X, a public cellular network, or a private cellular network.

12. The method of claim 8, wherein the vehicle is further configured to determine the positional data based on one or more of a fiducial associated with the charging station, identified via the camera, ultrasonics, or radar associated with the vehicle, or an alignment with a wheel chock and at least one wheel of the vehicle.

13. The method of claim 12, wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle.

14. One or more non-transitory computer-readable media storing processor-executable instructions that, when executed by at least one processor, cause the at least one processor to:

maneuver a vehicle toward a position and orientation associated with a charging station, wherein the maneuvering of the vehicle toward the position and orientation associated with the charging station is based on one or more instructions received from an infrastructure system;

receive, from one or more in-ground positioning sensors over which the vehicle travels, location data associated with a first position of the vehicle; and initiate, based on updated location data associated with a second position of the vehicle, an approach to engage the charging station, wherein the updated location data is received from the one or more in-ground positioning sensors, and wherein the updated location data is based on the location data.

15. The one or more non-transitory computer-readable media of claim 14, wherein the at least one processor is further caused to:

determine, based on the location data, that a direction of travel associated with the vehicle is outside an engageable distance from the charging station; and re-localize, based on the determination that the direction of travel associated with the vehicle is outside the engageable distance from the charging station, the vehicle, wherein the re-localized vehicle is re-directed toward the engageable distance from the charging station.

16. The one or more non-transitory computer-readable media of claim 14, wherein the position associated with the charging station is a global coordinate position and the one or more in-ground positioning sensors include pressure sensors, magnets, ultrasonics, proximity sensors, ultra-wide band tags, RFID tags, or a combination thereof.

17. The one or more non-transitory computer-readable media of claim 14, wherein the location data and the updated location data is received via one or more of: ultra-wide band, Bluetooth®, Wi-Fi, CV2X, a public cellular network, or a private cellular network.

18. The one or more non-transitory computer-readable media of claim 14, wherein the processor-executable instructions that, when executed by the at least one processor, maneuver the vehicle toward the position and orientation associated with the charging station, further causes the at least one processor to:

determine positional data associated with the first position and the second position of the vehicle.

19. The one or more non-transitory computer-readable media of claim 14, wherein the positional data is based on one or more of: a deep learning model used to detect the charging station via a camera associated with the vehicle; a fiducial associated with the charging station identified via the camera, ultrasonics, or radar associated with the vehicle; or an alignment with a wheel chock and at least one wheel of the vehicle.

20. The one or more non-transitory computer-readable media of claim 19, wherein the alignment with the wheel chock and the at least one wheel of the vehicle guides the vehicle to within a prespecified distance to the charging station, and wherein the prespecified distance to the charging station is within a range acceptable for an arm associated with the charging station to be able to plug a charger into a charging port of the vehicle.

* * * * *